United States Patent
Short et al.

(10) Patent No.: US 7,023,984 B1
(45) Date of Patent: Apr. 4, 2006

(54) AUTOMATIC VOLUME ADJUSTMENT OF VOICE TRANSMITTED OVER A COMMUNICATION DEVICE

(75) Inventors: Shannon M. Short, Atlanta, GA (US); William A. Hartselle, Norcross, GA (US); Vernon Meadows, Lilburn, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 457 days.

(21) Appl. No.: 10/101,716

(22) Filed: Mar. 21, 2002

(51) Int. Cl.
*H04M 1/00* (2006.01)

(52) U.S. Cl. ............... 379/388.03; 379/388.04; 379/388.05; 379/391

(58) Field of Classification Search ......... 379/387.01, 379/388.01, 388.03, 388.04, 388.05, 390.01, 379/390.03, 391; 381/55, 56, 71.1, 91, 94.1, 381/94.7, 119, 122; 455/219, 234.1, 238.1, 455/564.1, 564.2, 570; 704/226, 235, 236, 704/276, 228
See application file for complete search history.

(56) References Cited

U.S. PATENT DOCUMENTS

| | | | |
|---|---|---|---|
| 4,625,083 A | | 11/1986 | Poikela |
| 5,485,515 A | * | 1/1996 | Allen et al. ............... 379/391 |
| 5,615,256 A | | 3/1997 | Yamashita |
| 5,917,921 A | | 6/1999 | Sasaki et al. |
| 6,233,462 B1 | | 5/2001 | Kanai |
| 6,298,247 B1 | | 10/2001 | Alperovich et al. |
| 6,363,344 B1 | * | 3/2002 | Higuchi ............... 704/226 |
| 6,744,882 B1 | * | 6/2004 | Gupta et al. ........... 379/387.01 |
| 2002/0021798 A1 | * | 2/2002 | Terada et al. ........... 379/388.05 |
| 2003/0044025 A1 | | 3/2003 | Ouyang et al. |

* cited by examiner

Primary Examiner—Jefferey F. Harold
(74) Attorney, Agent, or Firm—Withers & Keys, LLC

(57) ABSTRACT

A system and method for adjusting the volume level of a communications device in response to a voice volume/ambient noise relationship. Ambient noise and voice volume are sampled and compared to a predetermined ambient noise to voice volume relationship. Voice volume is adjusted up or down in response to a control signal that is generated in view of the comparison between the sampled voice volume to ambient noise relationship and the predetermined ambient noise to voice volume relationship.

26 Claims, 3 Drawing Sheets

AUTOMATIC VOLUME ADJUSTMENT OF VOICE TRANSMITTED OVER A COMMUNICATION DEVICE

BACKGROUND

1. Field of the Invention

The present invention relates generally to voice communication and, more specifically, to automatic volume adjustment of an audible signal over a communication device.

2. Background of the Invention

Mobile telephones (or generally, mobile communications devices) have become ubiquitous; they show up in almost every environment. They are used in the home, at the office, in the car, on a train, at the airport, at the beach, at restaurants and bars, on the street, and almost any other imaginable venue. As might be expected, these diverse environments have relatively higher and lower levels of background or ambient noise. For example, there is generally less noise in a quiet home than there is in a crowded bar. Therefore, depending on the particular environment and its associated ambient noise level, it may be more or less difficult for the user of the mobile telephone to hear, not only what another party is saying over the mobile telephone connection, but also to hear himself talking.

More specifically, as the ambient noise in the mobile telephone user's environment increases the user of the mobile telephone tends to increase the volume level of his own voice so that he can hear himself over the ambient noise. Unfortunately, when the user speaks more loudly to compensate for the higher level of ambient noise, the called party is subjected to an abnormally high level of sound. In response, the called party can manipulate a manual volume adjusting function on his telephone (assuming such a function is available), or if such a function is not available, the called party might have to inconveniently distance his ear piece from his ear. In either case, it is very inconvenient, if not impossible, to properly adjust the volume of the mobile telephone speaker, in a timely manner, to properly compensate, comfortably, for the level of volume that is caused by the calling party. Further, it may also be particularly dangerous to manually adjust volume while doing certain tasks, such as driving. Accordingly, there is a need for improvements in volume control with respect telephony, and in particular, mobile telephony.

SUMMARY OF THE INVENTION

The present invention provides a novel system and method of adjusting the outgoing volume of a caller's voice so that the called party is not inconveniently bothered by intermittent or even constant relatively high volume levels due to relatively higher levels of ambient noise in the calling party's environment. More specifically, the present invention provides a method and system for automatically adjusting the volume of a caller's voice by sampling the ambient noise level in the caller's environment to detect a sample ambient noise level, sampling the volume of the caller's voice to detect a sample voice volume, comparing the sample ambient noise level and the sample voice volume, and adjusting the volume of the caller's voice based on a result of comparing the samples. This process is repeated at an appropriate sampling rate so that the volume adjustment can be effected in time to avoid inadvertent high volume levels, caused primarily by ambient noise, reaching another party.

In one aspect of the invention, ambient noise sampling is accomplished via a primary microphone and in another aspect, ambient noise sampling is accomplished via a secondary microphone alone, or a second microphone in combination with the primary microphone.

In accordance with an embodiment of the invention, the step of comparing samples includes determining a ratio between the sample voice volume and the sample ambient noise level, while in another embodiment the step of comparing samples comprises consulting a predetermined relationship between voice volume and ambient noise. In still another embodiment, an envelope of acceptable voice volume to ambient noise level relationships is consulted to determine whether voice volume adjustment is desirable.

It is therefore an object of the present invention to provide a system and method that automatically controls or adjusts the voice volume of one party to a telephone conversation in view of the ambient noise level in the environment in which that party is located.

It is also an object of the present invention to base a decision of whether to adjust voice volume on a predetermined voice volume to ambient noise relationship.

These and other objects of the present invention will become apparent upon reading the following detailed description in conjunction with the associated drawings.

DETAILED DESCRIPTION OF THE INVENTION

The present invention provides a unique calling party automatic volume adjustment feature for a communications device such as a conventional wire line telephone or mobile telephone. While the present invention has applicability to at least these types of communications devices, the principles of the present invention are equally applicable to other types of audio communications devices. For simplicity, the following description employs the term "mobile telephone" as an umbrella term to describe the several embodiments of the present invention, but those skilled in the art will appreciate that the use of such term is not to be considered limiting to the scope of the invention, which is set forth by the claims appearing at the end of this description.

Figure 1:
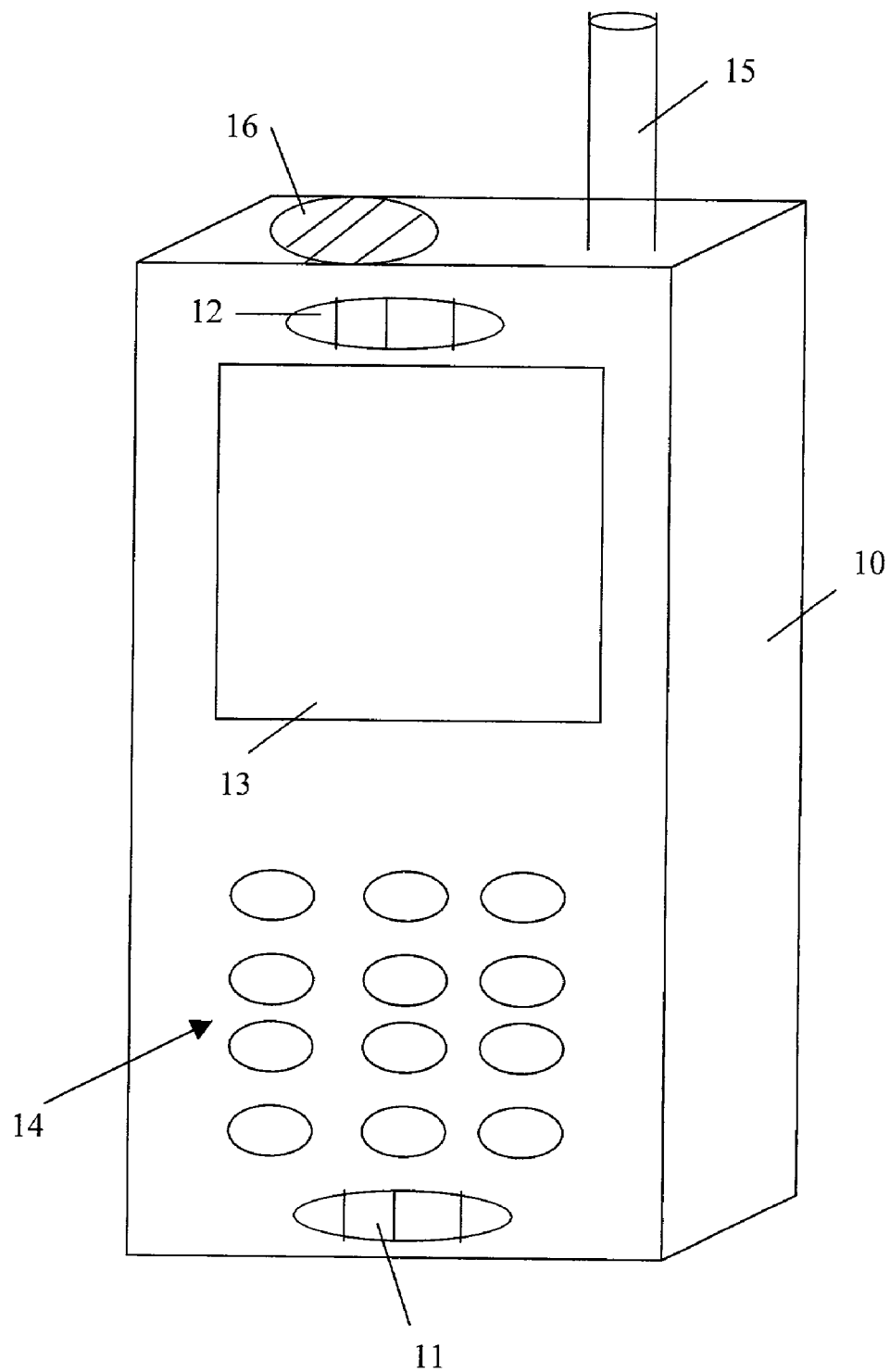
FIG. 1 illustrates an exemplary mobile telephone including an optional second microphone for sampling ambient noise in accordance with the present invention.

FIG. 1 illustrates an exemplary mobile telephone 10 that comprises a primary microphone 11, a speaker 12, an optional display screen 13, a keypad 14 and an antenna 15. Optionally, a secondary microphone 16 for sampling ambient noise level may also be provided for sampling ambient noise exclusively or in combination with primary microphone 11. Those skilled in the art will appreciate that speaker 12 could be replaced by an ear piece (not shown) that is worn by the mobile telephone user in the conventional manner. Speaker 12 is used herein to mean the device by which sound is transferred from the mobile telephone to the user.

Also, display screen 13 (if included) could be a touch screen display, which might incorporate keypad 14.

Figure 2:
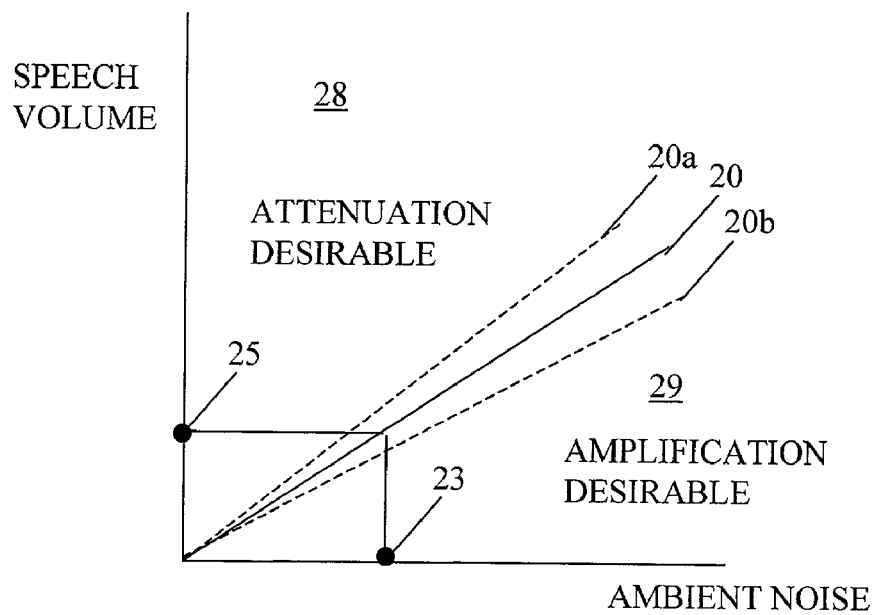
FIG. 2 illustrates an exemplary relationship between speech volume and ambient noise.

In accordance with preferred embodiments of the present invention, the volume level of the caller is automatically adjusted, in view of ambient noise, before the voice signal is transmitted to the called party. The invention, accordingly, protects the called party from relatively high levels of volume. FIG. 2 illustrates an exemplary relationship between speech volume and ambient noise, or, in other words, a speech volume to ambient noise relationship graph. Line 20 represents a theoretical "acceptable" or average speech volume that is necessary to hear oneself speaking over a mobile telephone in view of varying levels of ambient noise. For example, if a typical mobile telephone user places a call in an environment having an ambient noise level as shown by point 23, then that typical caller could speak at a voice volume no greater than point 25 to hear himself talking. Exactly where line 20 is drawn can be based on average human hearing data itself, a variant of such data to compensate for known telephone attenuation characteristics, or an arbitrary or custom pattern. In any case, it is well within the skill of those skilled in the art of, e.g., human hearing, to plot a line (or other non-linear graph) like line 20 that represents adequate voice volume to hear oneself in different ambient noise environments. In an alternative embodiment, a range of acceptable speech volumes may be considered, as shown by the envelope defined by lines 20*a* and 20*b*.

As shown further in FIG. 2, the speech volume to ambient noise relationship graph is divided into two sections 28 and 29 that correspond, respectively, to an "attenuation desirable" region and an "amplification desirable" region, which can be understood as follows. In the case where a calling party is talking too loudly for a given ambient noise level, then attenuation of the speech volume is likely desirable. Likewise, if a calling party's speech volume is lower than expected for a given ambient noise level, then amplification of the calling party's speech volume may be desirable. So, by determining which side of line 20 a given speech volume falls in relation to a given ambient noise level, it is possible to determine whether attenuation or amplification of the voice signal is desirable. Of course, if a given speech volume falls directly on line 20 for a given ambient noise level, then neither attenuation nor amplification of the speech signal is likely desirable. Those skilled in the art will appreciate that the graph shown in FIG. 2 is exemplary only and that its shape and slope are not themselves critical to the present invention.

Figure 3:
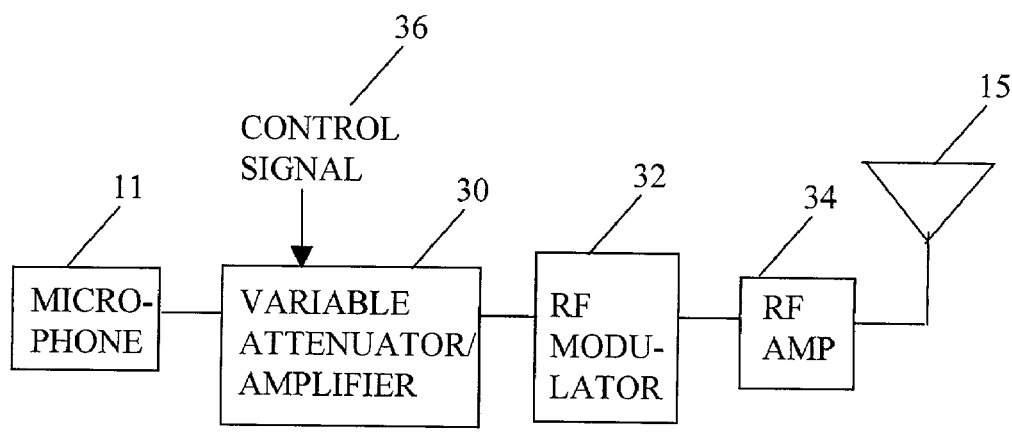
FIG. 3 illustrates an exemplary mobile telephone system architecture for implementing the features of the present invention.

FIG. 3 illustrates an exemplary mobile telephone system architecture for implementing the features of the present invention. As shown, there is preferably provided microphone 11, a variable attenuator/amplifier 30, a radio frequency modulator 32, a radio frequency amplifier 34 and antenna 15. Variable attenuator/amplifier 30 is preferably controlled by a control signal 36 that is preferably generated in response to whether the sampled voice is above or below a predetermined value, i.e., line 20 or the envelope defined by lines 20*a* and 20*b*, or in response to a ratio between ambient noise and speech volume. Thus, for example, if speech volume for a given ambient noise level is above line 20 (FIG. 2) then control signal 36 would cause variable attenuator/amplifier 30 to attenuate an incoming voice signal from microphone 11 such that the volume level is consistent with the expected volume level. Alternatively, if speech volume for a given ambient noise level is below line 20, then control signal 36 would preferably cause attenuator/amplifier 30 to amplify an incoming voice signal from microphone 11 up to the expected line 20 level. For a ratio implementation, a relatively simple inequality can be set up via which it is possible to determine if a volume level is above or below the expected value for a given ambient noise level.

Variable attenuator/amplifiers for purposes of the present invention are well known in the art and thus will not be described herein.

Figure 4:
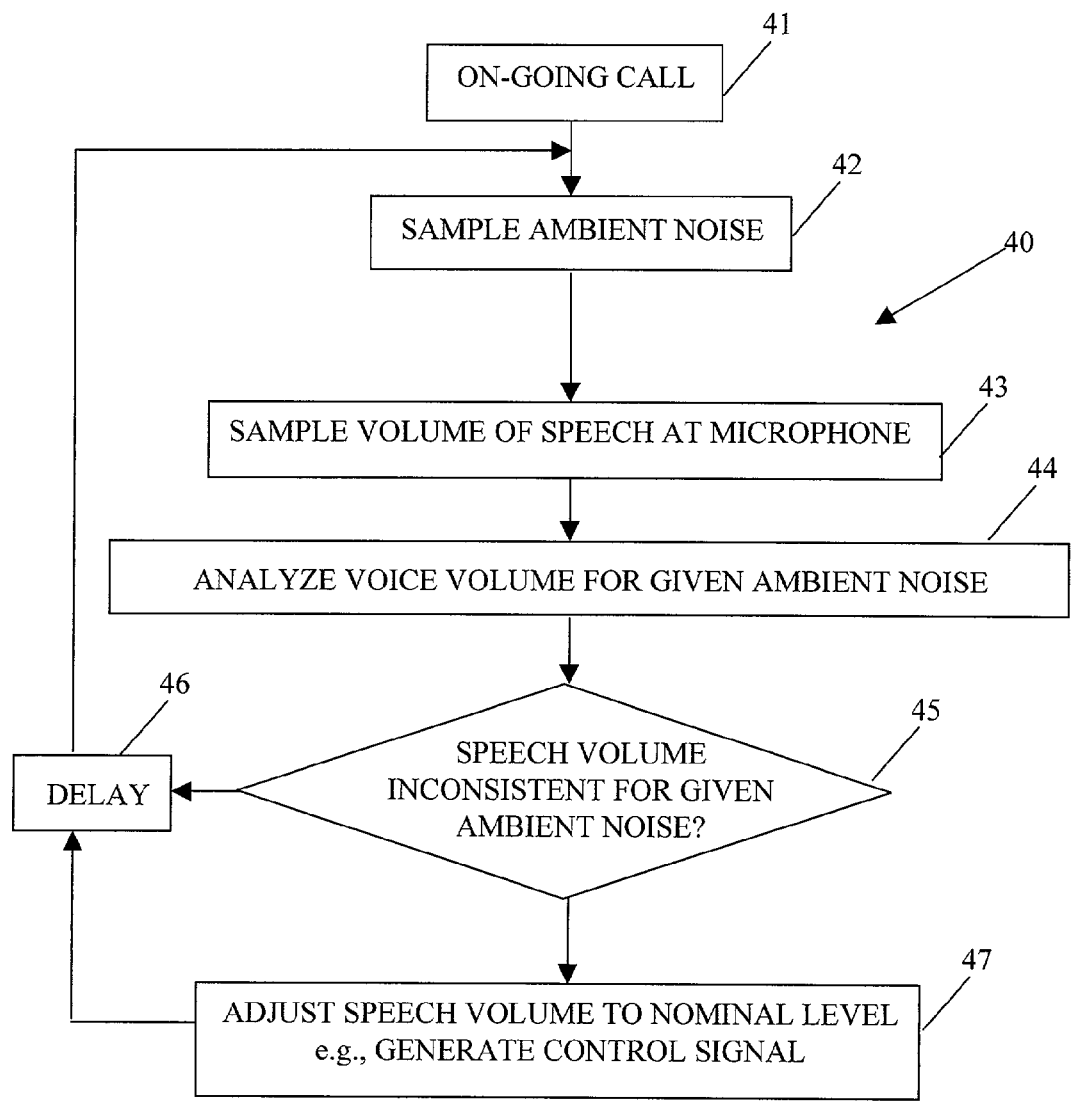
FIG. 4 illustrates an exemplary process for implementing calling party volume adjustment in accordance with the present invention.

FIG. 4 illustrates an exemplary process 40 for implementing calling party speech volume adjustment in accordance with the present invention. Process 40 begins at state 41 in which there is an on-going telephone call between a calling party and a called party. At step 42, ambient noise is sampled or detected. Sampling can be accomplished via microphone 11, for example, or alternatively, via secondary microphone 16 (if one is used), which might be less affected by the user's own voice when taking the measurement and, thus, might be more desirable in certain implementations of the present invention or by a combination of microphone 11 and microphone 16. It is noted that the periodicity of sampling (controlled by delay 46) can be set to whatever the prevailing digital signal processing art suggests. All that is required in the context of the present invention is the ability to monitor the ambient noise level (and voice volume) with sufficient precision to effect the overall principles of the invention.

At step 43, speech or voice volume is sampled or detected, preferably at the same or substantially the same periodicity and time as the ambient noise level sampling. Then, at step 44, an analysis of the sampled voice volume for a given ambient noise level is performed. At step 45, it is determined whether the speech volume is inconsistent for the given ambient noise level. That is, it is determined using a computerized representation of FIG. 2, for example, or an inequality or a table, whether the sampled speech volume is greater than or less than the average or typical or expected level. If not, process 40 continues with delay step 46 (i.e., the sampling rate), and then loops back to step 42 for another ambient noise sampling.

If the sampled speech volume was inconsistent with the sampled ambient noise level at step 45, then the speech volume is preferably adjusted accordingly. This can be accomplished by, e.g., generating an appropriate control signal 36.

As can be appreciated by those skilled in the art, the present invention does not simply control volume as in the case of an automatic gain control circuit, but instead controls volume in view of ambient noise and how ambient noise might affect the speech patterns of a mobile telephone user. Thus, the present invention provides a significant advance over known telephone systems.

In an alternative embodiment, and in one that makes use of the increasingly functionally rich digital network, control signal 36 can be transmitted to the called party for input into a variable attenuator/amplifier at the called party's end of the connection. This variable attenuator/amplifier could be positioned between a radio frequency demodulator and a speaker/ear piece of the called party's telephone. Since a significant purpose of the present invention is to shield the called party from inadvertent relatively high volume from the calling party, it does not matter where in the overall system the attenuation or amplification takes place so long as it takes place prior to being sent to the called party's ear piece. In the foregoing alternative embodiment it is also considered within the scope of the present invention to determine at a set-up time of a call whether neither, one or both telephones are configured to operate in accordance with the principles of the present invention. Where both mobile telephones have the requisite functionality, a default condition could be employed wherein the called party's or the calling party's mobile telephone effects the voice volume adjustment.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of automatically adjusting the volume of a caller's voice, comprising the steps of:
    (a) sampling an ambient noise level in an environment in which a communications device is operating to detect a sample ambient noise level;
    (b) sampling a volume of a caller's voice in the same environment and at substantially the same time as ambient noise level sampling to detect a sample voice volume;
    (c) analyzing the sample ambient noise level and the sample voice volume to determine whether the voice volume is adequate relative to the ambient noise level by looking up the sample ambient noise level relative to the sample voice volume in a data table that provides an indication of voice volume levels that are adequate for ambient noise levels; and
    (d) adjusting the volume of the caller's voice based on a result of analyzing the samples when the result indicates that the voice volume is not adequate.

2. The method of claim 1, further comprising periodically repeating steps (a)–(d).

3. The method of claim 1, wherein the step of adjusting comprises at least one of attenuating the volume of the caller's voice and amplifying the volume of the caller's voice.

4. The method of claim 1, wherein the step of adjusting comprises adjusting the volume of the caller's voice at the communications device.

5. The method of claim 1, further comprising generating a control signal that effects, at least in part, the step of adjusting.

6. The method of claim 5, further comprising transmitting the control signal to a telephone of a called party, wherein the step of adjusting comprises adjusting the volume of the caller's voice via an attenuator/amplifier within the telephone of the called party.

7. The method of claim 1, wherein the communications device comprises a mobile telephone.

8. A method of protecting a first party to a telephone call from a high level of voice volume of a second party to the telephone call, the method comprising:
    (a) periodically detecting an ambient noise level in an environment in which the second party to the telephone call is located;
    (b) detecting, with substantially the same periodicity, a voice volume level of the second party;
    (c) determining whether the sampled voice volume is greater than a predetermined value relative to the sampled ambient noise level to determine whether the voice volume is adequate relative to the ambient noise level, wherein a data table stores predetermined values of voice volume relative to ambient noise levels and wherein the determining comprises consulting the data table for the sampled voice volume and the sampled ambient noise level; and
    (d) adjusting the voice volume of the second party when it is determined that the voice volume is not adequate relative to the sampled ambient noise level.

9. The method of claim 8, wherein the step of adjusting comprises adjusting the voice volume of the second party at a telephone belonging to the first party.

10. The method of claim 8, wherein the step of adjusting comprises adjusting the voice volume of the second party at a telephone belonging to the second party.

11. The method of claim 8, further comprising detecting the ambient noise level via a primary microphone.

12. The method of claim 11, further comprising detecting the ambient noise level via a secondary microphone.

13. The method of claim 8, wherein the step of adjusting comprises at least one of attenuating the voice volume of the second party and amplifying the voice volume of the second party.

14. The method of claim 8, further comprising generating a control signal that effects, at least in part, the step of adjusting.

15. The method of 14, wherein the step of adjusting further comprises transmitting the control signal to a communications device of a first party, wherein further the step of adjusting comprises adjusting the volume of the second party's voice via an attenuator/amplifier within the communications device belonging the first party.

16. A system for automatically adjusting the volume of a caller's voice, comprising:
    (a) means for sampling an ambient noise level in an environment in which a communications device is operating to detect a sample ambient noise level via at least a primary microphone;
    (b) means for sampling a volume of a caller's voice in the same environment and at substantially the same time as ambient noise level sampling to detect a sample voice volume via a secondary microphone;
    (c) means for analyzing the sample ambient noise level and the sample voice volume to determine whether the voice volume is adequate relative to the ambient noise level, wherein the means for analyzing comprises a data table that stores predetermined values of voice volume relative to ambient noise levels and wherein the means for analyzing consults the data table for the sampled voice volume and the sampled ambient noise level; and
    (d) means for adjusting the volume of the caller's voice based on a result of analyzing the samples when the result indicates that the voice volume is not adequate relative to the ambient noise level.

17. The system of claim 16, wherein the means for adjusting is operable to at least one of attenuate the volume of the caller's voice and amplify the volume of the caller's voice.

18. The system of claim 16, wherein the means for adjusting is operable to adjust the volume of the caller's voice at the communications device.

19. The system of claim 16, wherein the means for adjusting is operable to adjust the volume of the caller's voice at the communications device belonging to another party.

20. The system of claim 16, further comprising means for generating a control signal that is used to control, at least in part, the means for adjusting.

21. The system of claim 20, wherein the means for adjusting includes the means for transmitting the control signal to the telephone of a called party, wherein further means for adjusting comprises adjusting the volume of the caller's voice via an attenuator/amplifier within a communication device belonging to the called party.

22. The system of claim 16, wherein the communications device comprises a mobile telephone.

23. A system for automatically adjusting the volume of a caller's voice, comprising:
 (a) a primary microphone for sampling an ambient noise level in an environment in which a communications device is operating to detect a sample ambient noise level;
 (b) a secondary microphone for sampling a volume of a caller's voice in the same environment and at substantially the same time as ambient noise level sampling to detect a sample voice volume: and
 (c) means for analyzing the sample ambient noise level and the sample voice volume to determine whether the voice volume is adequate relative to the ambient noise level and for generating a control signal in accordance with a relationship between the sample ambient noise level and the sample voice volume, wherein the means for analyzing comprises a data table that stores predetermined values of voice volume relative to ambient noise levels and wherein the means for analyzing consults the data table for the sampled voice volume and the sampled ambient noise level, and
 wherein the control signal is employed to adjust the volume of the caller's voice to cause the voice volume to become adequate relative to the ambient noise level.

24. The system of claim 23, wherein the caller's voice is at least one of attenuated and amplified.

25. The system of claim 23, wherein the communications device comprises a mobile telephone.

26. The method of claim 23, wherein the means for analyzing further comprise means for transmitting the control signal to a communications device of a called party, wherein the control signal adjusts the volume of the caller's voice via an attenuator/amplifier within a communication device belonging to another party.

* * * * *